(12) United States Patent
Akagi et al.

(10) Patent No.: US 7,870,917 B2
(45) Date of Patent: Jan. 18, 2011

(54) DRIVE DEVICE FOR ELECTRICALLY MOVABLE VEHICLES AND ELECTRIC WHEELCHAIR HAVING SAME

(75) Inventors: Takayoshi Akagi, Otsu (JP); Takuya Noro, Kusatsu (JP); Kazuhiro Tomoshige, Kasai (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 580 days.

(21) Appl. No.: 11/256,274

(22) Filed: Oct. 24, 2005

(65) Prior Publication Data
US 2006/0096793 A1 May 11, 2006

(30) Foreign Application Priority Data
Oct. 25, 2004 (JP) ............................. 2004-309524
Oct. 25, 2004 (JP) ............................. 2004-309528

(51) Int. Cl.
*B60K 1/00* (2006.01)
(52) U.S. Cl. .................... 180/65.51; 180/65.6; 180/65.1
(58) Field of Classification Search .............. 280/250.1, 280/244, 304.1; 180/907, 205, 65.5, 65.1, 180/19.3, 65.3, 65.6, 65.71; 310/67 R, 77, 310/209, 261; 188/162
See application file for complete search history.

(56) References Cited

U.S. PATENT DOCUMENTS

| 5,014,800 | A | * | 5/1991 | Kawamoto et al. ....... 180/65.51 |
| 5,161,634 | A | | 11/1992 | Ichihara et al. |
| 5,246,082 | A | * | 9/1993 | Alber ....................... 180/65.51 |
| 5,382,854 | A | * | 1/1995 | Kawamoto et al. ........ 310/67 R |
| 5,540,296 | A | * | 7/1996 | Strothmann ................ 180/19.3 |
| 5,540,297 | A | * | 7/1996 | Meier ........................ 180/65.5 |
| 5,600,191 | A | | 2/1997 | Yang |
| 5,762,155 | A | * | 6/1998 | Scheulderman ............ 180/65.1 |

(Continued)

FOREIGN PATENT DOCUMENTS

JP 09-117476 5/1997

(Continued)

OTHER PUBLICATIONS

Japanese Office Action dated Jul. 21, 2009, issued in corresponding Japanese patent application No. 2004-309528 (partial translation).

(Continued)

*Primary Examiner*—Hau V Phan
(74) *Attorney, Agent, or Firm*—Westerman, Hattori, Daniels & Adrian, LLP

(57) ABSTRACT

The invention provides a drive device for electric vehicles which is small-sized, improved in heat radiating characteristics and adapted for use with a drive wheel of reduced diameter, and an electric wheelchair comprising the drive device. The drive device is provided on the inner periphery of each of left and right drive wheels (80), (80) of the electric vehicle and comprises a casing (30) supported at one end thereof by an axle (22) on the electric vehicle, a motor (40) housed in the casing (30) and having a rotating shaft (43) aligned with the axle (22), and a housing (50) rotatably fitted around the casing (30) and rotatable by the rotation of the motor (40). The drive wheel (80) is provided around the outer periphery of the housing (50) and rotatable therewith.

9 Claims, 8 Drawing Sheets

U.S. PATENT DOCUMENTS

| | | | | |
|---|---|---|---|---|
| 5,818,134 | A * | 10/1998 | Yang et al. | 310/78 |
| 5,894,902 | A * | 4/1999 | Cho | 180/65.5 |
| 5,964,473 | A * | 10/1999 | Degonda et al. | 280/250.1 |
| 6,092,615 | A * | 7/2000 | Pusch et al. | 180/65.5 |
| 6,100,615 | A * | 8/2000 | Birkestrand | 310/75 C |
| 6,155,367 | A * | 12/2000 | Alber | 180/65.5 |
| 6,158,757 | A * | 12/2000 | Tidcomb | 280/250.1 |
| 6,260,645 | B1 * | 7/2001 | Pawlowski et al. | 180/65.3 |
| 6,286,616 | B1 * | 9/2001 | Kutter | 180/205 |
| 6,328,123 | B1 * | 12/2001 | Niemann et al. | 180/65.51 |
| 6,355,996 | B1 * | 3/2002 | Birkestrand | 310/54 |
| 6,494,278 | B1 * | 12/2002 | Weisz | 180/65.5 |
| 7,017,694 | B2 * | 3/2006 | Shirazawa | 180/65.5 |
| 7,100,747 | B1 * | 9/2006 | Conrad et al. | 188/162 |
| 7,342,342 | B2 * | 3/2008 | Naitou et al. | 310/209 |
| 7,350,605 | B2 * | 4/2008 | Mizutani et al. | 180/65.51 |
| 7,527,113 | B2 * | 5/2009 | Jenkins | 180/65.51 |
| 2006/0087182 | A1 | 4/2006 | Sugiyama | |

FOREIGN PATENT DOCUMENTS

| | | |
|---|---|---|
| JP | 09-123930 A | 5/1997 |
| JP | 09-296829 | 11/1997 |
| JP | 09-308651 A | 12/1997 |
| JP | 10-248877 A | 9/1998 |
| JP | 2000-014714 A | 1/2000 |
| JP | 2000-070309 | 3/2000 |
| JP | 2002-085474 A | 3/2002 |
| JP | 2002-349493 A | 12/2002 |
| JP | 3432977 A | 8/2003 |
| JP | 3432977 B2 | 8/2003 |
| JP | 2006-116185 A | 5/2006 |

OTHER PUBLICATIONS

Japanese Notice of Reasons for Refusal dated Aug. 11, 2009, issued in corresponding Japanese patent application No. 2004-309524 (partial translation).

* cited by examiner

DRIVE DEVICE FOR ELECTRICALLY MOVABLE VEHICLES AND ELECTRIC WHEELCHAIR HAVING SAME

FIELD OF THE INVENTION

The present invention relates to drive devices for use in electrically movable vehicles, i.e., electric vehicles, such as electric wheelchairs, and more particularly to electric vehicle drive devices having a drive wheel around the device and to be supported only at one end thereof by an electric vehicle.

BACKGROUND OF THE INVENTION

Electric vehicles such as electric wheelchairs include those having a drive device for driving each of left and right drive wheels individually with a motor (as disclosed, for example, in Japanese Patent No. 3432977, JP-A No. 9-296829 and JP-A No. 2000-70309).

The drive device disclosed in Japanese Patent No. 3432977 comprises a hollow hub case rotatably mounted on an axle at the center of the drive wheel, a metal closure covering an opening of the hub case, a case having enclosed therein a motor for the drive wheel and an electromagnetic brake, fixed to the wall of the hub case opposite to the closure and positioned as offset from the axle, and a reduction gear and a power controller which are housed in the hub case.

The closure is made of a metal having high thermal conductivity to produce an enhanced effect to radiate heat from the motor and the power controller. The power controller is disposed on the other side of the axle opposite to and away from the motor to thereby suppress the overheating of the controller (see, for example, Japanese Patent No. 3432977).

With the drive device disclosed in Japanese Patent No. 3432977, the motor and the electromagnetic brake are arranged on the other side of the cooling closure opposite to the hub case and positioned as offset from the axle. This arrangement invariably gives the drive device an increased diameter (about 30 to about 40 cm) and also gives an increase diameter to the wheel provided around the drive device. The increase in the wheel diameter is likely to make it difficult for the user to move from the wheelchair, for example, to a bed, renders the wheelchair itself greater in size and weight and therefore makes the wheelchair inconvenient to move indoors and to drive with a short turning radius.

The drive devices disclosed in JP-A No. 9-296829 and No. 2000-70309 comprise an electromagnetic brake for braking or holding the rotation of the drive shaft when the motor is deenergized, and a clutch mechanism for blocking the braking force or holding force. The brake is disposed on the other side of the motor opposite to the drive wheel, and the clutch mechanism is interposed between the motor and the drive wheel.

When the clutch is disengaged, the transmission of power from the motor to the drive wheel is therefore interrupted, and the motor fails to deliver its braking force to the drive wheel. Accordingly, if the user disengages the clutch mechanism in error with the electromagnetic brake actuated, for example, on a downward slope, an effective braking force as of dynamic braking fails to act on the drive wheel, possibly permitting the vehicle to move down the slope while being accelerated.

SUMMARY OF THE INVENTION

A first object of the present invention is to provide an electric vehicle drive device which can be reduced in size and in the diameter of the drive wheel and which is improved in braking performance, and an electric wheelchair comprising the drive device.

A second object of the invention is to provide an electric vehicle drive device wherein when a clutch mechanism is disengaged, an electromagnetic brake exerts no force on the drive wheel but a motor exerts a braking force on the drive wheel, and an electric wheelchair comprising the drive device.

To fulfill the first object, the present invention provides an electric vehicle drive device provided on an inner periphery of each of left and right drive wheels of an electric vehicle, the drive device comprising a casing supported at one end thereof by an axle on the electric vehicle, a motor housed in the casing and having a rotating shaft aligned with the axle, and a housing rotatably fitted around an outer periphery of the casing and rotatable by the rotation of the motor, the drive wheel being provided around an outer periphery of the housing and rotatable with the housing.

With the drive device of the present invention, the axle supporting the drive device is in alignment with the rotating shaft of the motor, so that the drive device itself can be reduced in size, and the drive wheel to be provided around the outer periphery of the drive device can be smaller in diameter. Since the rotating shaft and the drive wheel are rotatable about the same center, unevenness of the reaction force is avoidable, permitting the axle aligned with the rotating shaft to receive the reaction force uniformly.

Further to fulfill the first object, the present invention provides an electric vehicle drive device provided on an inner periphery of each of left and right drive wheels of an electric vehicle, the drive device comprising a casing supported at one end thereof by an axle on the electric vehicle, a motor housed in the casing and having a rotating shaft aligned with the axle, an electromagnetic brake housed in the casing and disposed closer to the axle than the motor for braking the motor, and a housing rotatably fitted around an outer periphery of the casing and rotatable by the rotation of the motor, the drive wheel being provided around an outer periphery of the housing and rotatable with the housing.

With the drive device of the present invention, the axle supporting the drive device is in alignment with the rotating shaft of the motor, so that the drive device itself can be reduced in size, and the drive wheel to be provided around the outer periphery of the drive device can be smaller in diameter. Since the rotating shaft and the drive wheel are rotatable about the same center, unevenness of the reaction force is avoidable, permitting the axle aligned with the rotating shaft to receive the reaction force uniformly.

With the brake disposed closer to the axle than the motor, the wiring for the electromagnetic brake can be shortened, and the drive device is simplified in interior construction and made easy to maintain.

To fulfill the second object, the present invention provides an electric vehicle drive device comprising:

a casing supported at one end thereof by an axle on an electric vehicle, a motor housed in the casing and having a rotating shaft aligned with the axle, a housing rotatably fitted around an outer periphery of the casing and coupled to an outer end of the motor by a reduction mechanism, a drive wheel provided around an outer periphery of the housing, and an electromagnetic brake for braking the rotation of the rotating shaft of the motor at a base end of the rotating shaft, a clutch mechanism being disposed between the rotating shaft of the motor and the electromagnetic brake for connecting the rotating shaft to the brake or disconnecting the rotating shaft from the brake.

With the drive device of the invention, the brake is disconnected from the rotating shaft of the motor by the clutch mechanism. This makes it possible to rotate the drive wheel coupled to the motor even when the brake is in operation. Since the transmission of power from the rotating shaft to the drive wheel is not interrupted at this time, the braking force as of dynamic braking acts on the drive wheel even when the motor is free of the action of the brake with the clutch mechanism disengaged. The drive wheel is therefore unlikely to rotate freely.

Accordingly, even if the clutch mechanism is disengaged when the vehicle is held at rest on a downward slope or the like by the brake, the dynamic braking force or the like of the motor obviates the likelihood that the vehicle will become accelerated over a given speed, hence improved safety.

DESCRIPTION OF THE PREFERRED EMBODIMENTS

First Embodiment

This embodiment will be described below with reference to an electric wheelchair 10 serving as an electric vehicle and to be used by elderly or disabled persons, whereas the present invention is applicable also to other electric vehicles such as golf carts or small vehicles.

Figure 1:
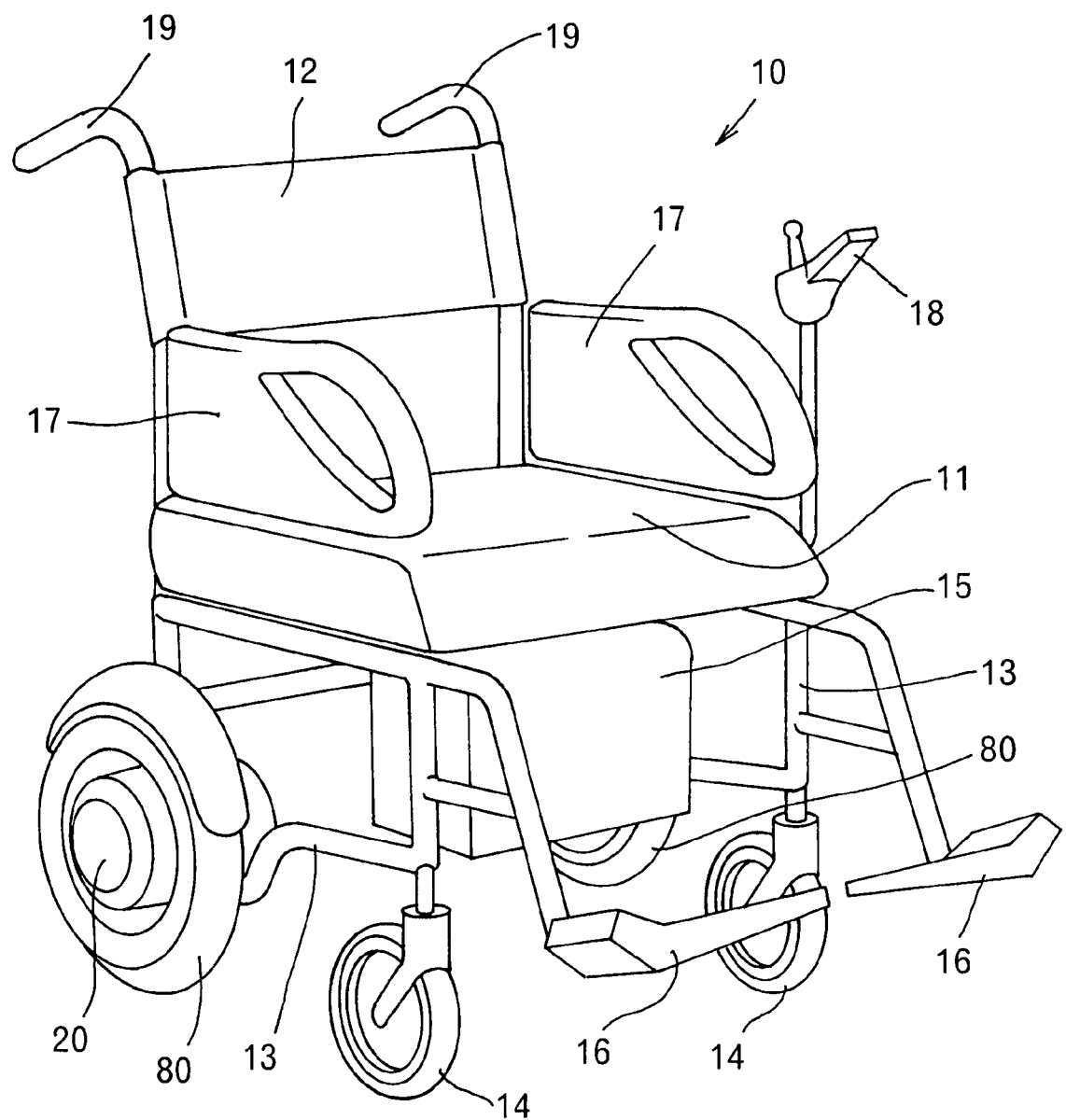
FIG. 1 is a perspective view of an electric wheelchair of first embodiment of the invention.

FIG. 1 is a perspective view of the electric wheelchair 10, which comprises a pair of drive devices 20, 20 of the invention provided for respective left and right drive wheels 80, 80. The wheelchair 10 comprises a seat 11 for the user to sit in, and a backrest 12. Extending downward from the seat 11 is a frame 13 provided with the left and right drive devices 20, 20 and drive wheels 80, 80. Positioned to the front of the respective drive wheels 80, 80 are auxiliary wheels 14, 14 supported by the frame 13 and having a smaller diameter than the drive wheels 80, 80.

Disposed under the seat 11 is a control box 15 having a battery, power controller and other control means. Footrest pedals 16, 16 are arranged in front of and below the seat 11, and a pair of armrests 17, 17 are provided on opposite sides of the seat 11. A control device 18 for the user is provided on one side of one of the armrests 17. Extending rearward from the upper portion of the backrest 12 are handles 19, 19 for the help.

The control device 18 can be, for example, of the joystick type for varying the speed of the wheelchair 10 and turning the wheelchair 10. The wheelchair 10 can be advanced or moved backward by inclining the joystick forward or backward. The wheelchair 10 can be turned leftward or rightward by inclining the joystick leftward or rightward to thereby vary the rotational speeds of the drive wheels 80, 80.

Figure 2:
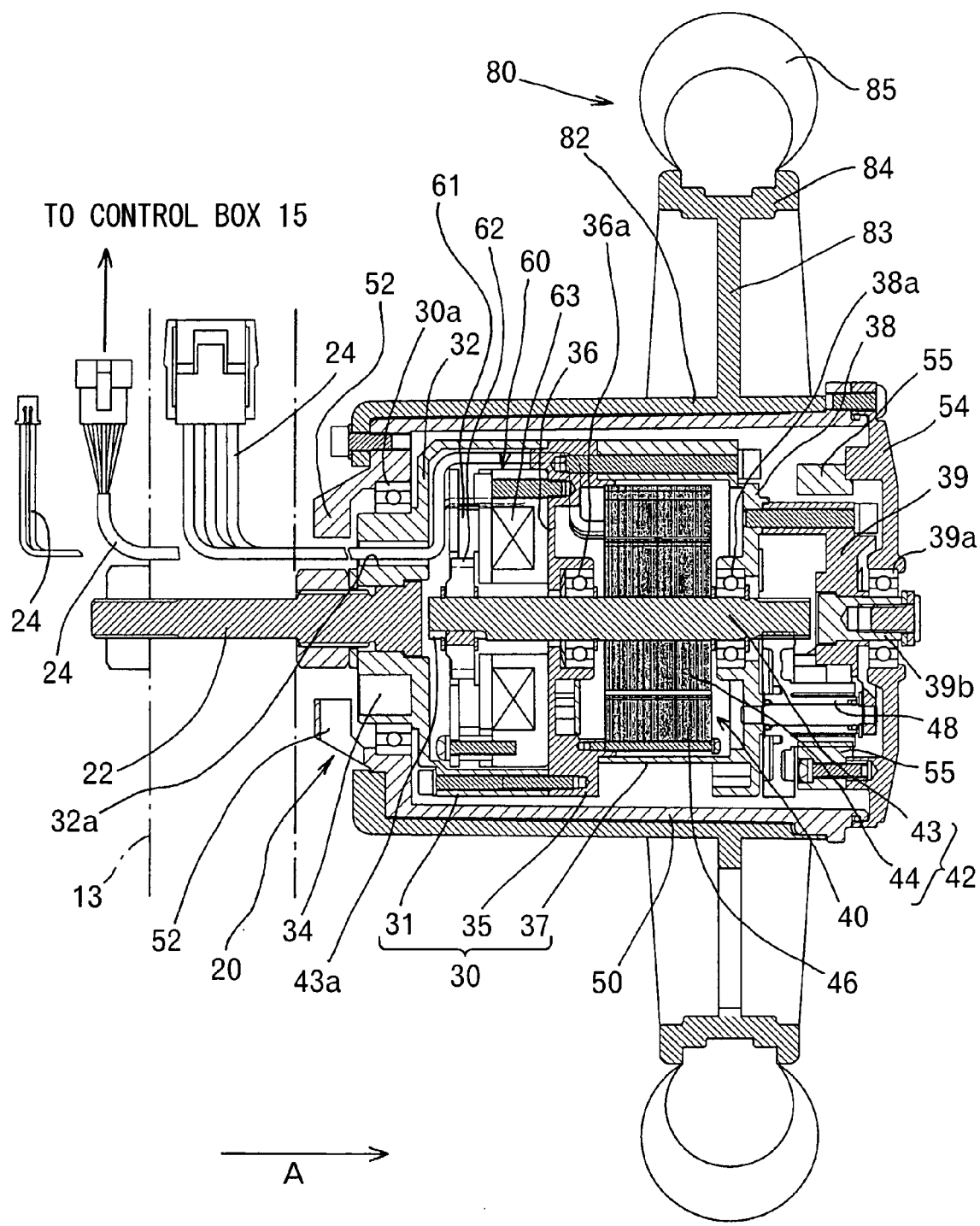
FIG. 2 is a sectional view of a drive device and a drive wheel of the first embodiment.
Figure 3:
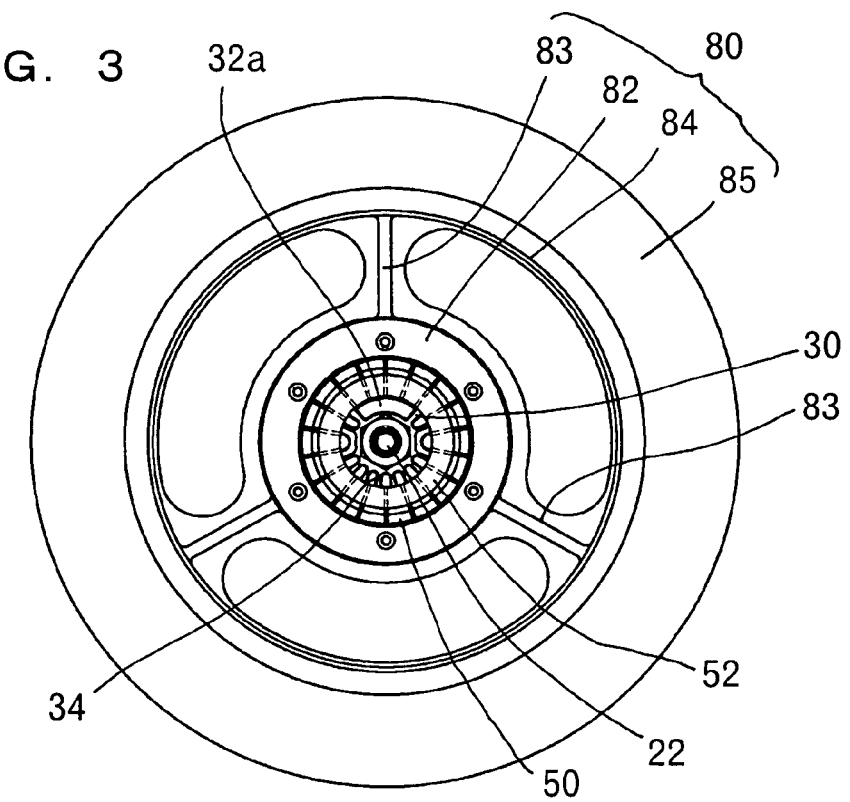
FIG. 3 is a side elevation of FIG. 2 as the device and wheel are seen from the direction of arrow A.
Figure 4:
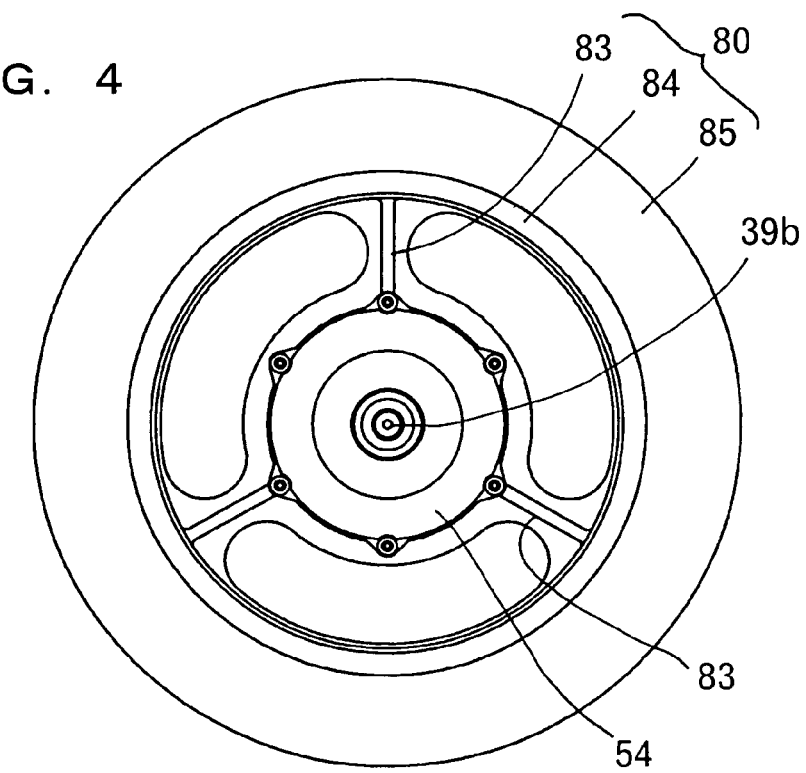
FIG. 4 is a side elevation of FIG. 2 as the device and wheel are seen from a direction opposite to the arrow A.

FIG. 2 is a sectional view of the drive device 20 of the invention and the left drive wheel 80 attached to the drive device 20. FIG. 3 is a side elevation of the drive device 20 as it is seen from the direction of arrow A in FIG. 2, and FIG. 4 is a side elevation of the device as it is seen from the opposite direction.

The drive device 20 comprises a casing 30 which is provided with an axle 22 projecting therefrom toward the frame 13 of the wheelchair 10 and mounted on the frame 13, a motor 40 disposed in the casing 30, a housing 50 coupled to the rotating shaft 43 of the motor 40 by a reduction gear 48 and freely rotatable relative to the casing 30, and an electromagnetic brake 60 for couplable to the rotating shaft 43 of the motor 40 and for braking the shaft 43 and the casing 30. The drive wheel 80 is fitted around the drive device 20.

It is desired that the casing 30 and the housing 50 be made from a metal material having high thermal conductivity, such as an aluminum alloy, so as to be improved in heat radiating characteristics.

The casing 30 which is supported at one end thereof by the axle 22 on the frame 13 can be of a construction comprising three components as divided axially thereof. An inner casing member 31 positioned closer to the frame 13 is closed at one end thereof with an end plate 32 having fixed thereto the outer end of the axle 22. The other end of the casing member 31 is left open. The axle 22 can be attached to the inner casing member 31 by a press fit.

A middle casing member 35 has one end fixed to the inner casing member 31 and an inner periphery provided with an annular plate 36 extending toward the rotating shaft 43 of the motor 40. A bearing 36a rotatably supporting the rotating shaft 43 thereon is provided on the inner peripheral edge of the annular plate 36. The annular plate 36 has the electromagnetic brake 60 attached to the inner casing member side thereof and the stator 46 of the motor 40 fixed to the rear side thereof.

An outer casing member 37 has one end fixed to the middle casing member 35 and surrounds the outer periphery of the stator 46. The other end of the outer casing member 37 is provided with an annular end plate 38 A bearing 38a rotatably supporting the rotating shaft 43 of the motor 40 thereon is provided on the inner peripheral edge of the end plate 38. The reduction gear 48 is mounted on the outer side of the end plate 38.

Wiring 24 for energizing the stator 46 and the brake 60 therethrough extends through the end plate 32 of the inner casing member 31 as at 32a to the control box 15 under the seat 11.

The end plate 32 of the inner casing member 31 has a plurality of heat radiating fins 34 as shown in FIG. 2 in addition to a through hole 32a for the wiring 24 to extend therethrough. The fins 34 are cooled with air by the rotation of blades 52 provided on the housing 50 to be described later.

The motor 40 has a rotor 42 which comprises the rotating shaft 43 supported by the bearings 36a, 38a in alignment with the axle 22, and a stack of metal plates 44 fittingly mounted on the shaft 43 so as to be opposed to the stator 46.

The portion of the rotating shaft 43 closer to the frame extends through the electromagnetic brake 60 and has keyways 43a for an inner driver 62 of the brake 60 to engage in. The inner driver 62 is in engagement with a brake disk 61.

The other end of the rotating shaft 43 is in mesh with the reduction gear 48.

A known brake of the negative actuated type is usable as the electromagnetic brake 60. The brake 60 has a coil 63 which is energized to deactivate the brake, while when the coil is deenergized, a spring force applies pressure to the brake disk 61 to directly brake the rotating shaft 43. Thus, improved brake performance is available.

It is more desirable to position the electromagnetic brake 60 closer to the axle 22 than the motor 40. The provision of the brake 60 closer the axle 22 shortens the wiring 24 for the brake 60, simplifies the internal construction and achieves improved maintenance.

If the brake 60 is disposed outwardly of the reduction gear 48, on the other hand, the wiring 24 for the brake 60 needs to extend on the outer side of the reduction gear 48 and the motor 40. This makes the internal construction complex and renders the device greater in size and inefficient to maintain.

The reduction gear 48 can be, for example, a planetary gear mechanism. The gear 48 is supported between the end plate 38 of the outer casing member 37 and a holding plate 39 opposed and fixed to the end plate 38. The reduction gear 48 is in mesh with an internal gear 55 formed on the inner side of a closure 54 closing the outer end of the housing 50.

When the rotor 42 is rotated by the energization of the stator 46, the torque is delivered to the closure 54 through the reduction gear 48 and the internal gear 55 to rotate the housing 50.

The housing 50 has one end closer to the frame 13 and supported by a bearing 30a on the inner casing member 31. The opening of the other housing end is closed with the closure 54.

The closure 54, which has the internal gear 55 as described above, is rotatably supported by a bearing 39a on a shaft 39b projecting from the center of the holding plate 39.

The end of the housing 50 closer to the frame 13 is provided with the above-mentioned blades 52 projecting toward the axle 22. These blades 52 are opposed to the radiating fins 34 on the inner casing member 31. The rotation of the housing 50 causes the blades 52 to apply air to the fins 34 for the blades 52 to act as a cooling fan, whereby the heat generated from the motor 40 and electromagnetic brake 60 is dissipated efficiently without remaining in the interior of the device.

The drive wheel 80 can be composed of a tubular hub case 82 fitting around the housing 50 of the drive device 20 and rotatable therewith, a plurality of spokes 83 projecting from the outer periphery of the hub case 82, an annular rim 84 interconnecting the outer ends of the spokes 83 and a rubber tire 85 fitting around the rim 84.

Preferably, the drive wheel 80 is so positioned that the drive device 20 will not project outward beyond the tire 85. According to the present embodiment, the spokes 83 are positioned toward the outer end of the hub case 82 away from the axle 22 to thereby diminish the amount of projection of the drive device 20 beyond the tire 85.

The drive device 20 thus constructed is secured to the electric wheelchair 10, with the axle 22 supported at one end thereof by the frame 13. When the electric wheelchair 10 is to be used without making the drive device 20 removable therefrom, the drive device 20 may be fastened to the frame 13 as with a bolt, whereas if there is a need to remove the drive device 20 along with the drive wheel 80 as fitted therearound, for example, to carry the wheelchair 10 on a motor vehicle, a structure may be provided for preventing the axle 22 from slipping off from the frame 13 axially thereof so as to render the drive device removable easily. When required, a member may be provided for receiving the reaction force of torque of the motor 40.

When the user gives a command to advance, retract or turn the electric wheelchair 10 by the control device 18, each electromagnetic brake 60 is energized and thereby deactivated, and each stator 46 is energized to rotate the rotor 42. When the rotor 42 is rotated, a drive force is delivered from the rotating shaft 43 to the housing 50 by way of the reduction gear 48 and the internal gear 55 to rotate the housing 50. This rotates the drive wheel 80 secured to the housing 50. Thus, the electric wheelchair 10 is advanced or retracted. The wheelchair 10 is turned by varying the rotational speeds of the left and right drive devices 20.

With the drive device 20 of the present invention, the axle 22 supporting the drive device 20 and the rotating shaft 43 of the motor 40 are arranged in alignment with each other, so that the drive device 20 itself can be made small-sized (up to about 15 cm in diameter). The drive wheel 80 provided around the drive device 20 can therefore be given a reduced diameter. Since the rotating shaft 43 and the drive wheel 80 are rotatable about the same center, the unevenness of reaction force can be eliminated, and the reaction force can be received uniformly by the axle 22 in alignment with the shaft 43.

Further with the drive device 20 of the present invention, the casing 30 is provided with heat radiating fins 34, which are cooled with blades 52 provided on the housing 50, while the casing 30 and the housing 50 are made of a material having high heat conductivity. Consequently, the heat generated by the operation of the motor 40 can be dissipated efficiently without remaining inside the drive device 20.

The blades 52, although made integral with the housing 50, may alternatively be provided as separate members or on the hub case 82 of the drive wheel 80.

Second Embodiment

According to this embodiment, a drive device 20 comprises a clutch mechanism 70 for connecting the rotating shaft 43 to the electromagnetic brake 60 or disconnecting the shaft 43 from the brake 60. Throughout the drawings showing the first and second embodiments, like parts are designated by like reference numerals.

Figure 5:
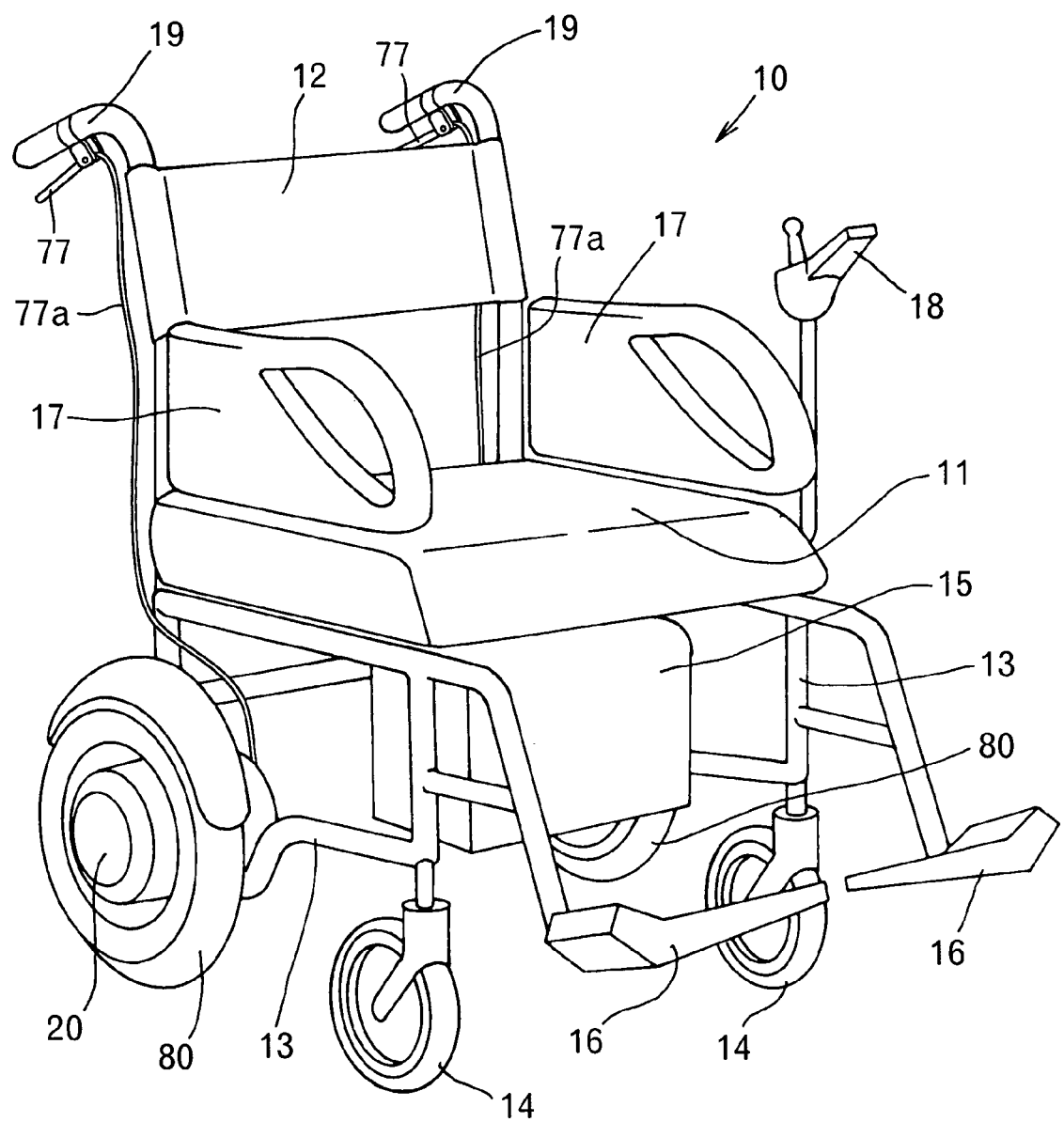
FIG. 5 is a perspective view of an electric wheelchair of second embodiment of the invention.

FIG. 5 is a perspective view of an electric wheelchair 10 wherein the drive device 20 of the second embodiment is provided for each of left and right drive wheels 80, 80. Handles 19, 19 for the help extend rearward from the upper portion of a backrest 12. Each of the handles 19 is provided with a clutch controller 77 (to be described later) for engaging or disengaging the clutch mechanism 70.

The control device 18 can be, for example, of the joystick type for varying the speed of the wheelchair 10 and turning the wheelchair 10. The wheelchair 10 can be advanced or moved backward by inclining the joystick forward or backward. The wheelchair 10 can be turned leftward or rightward by inclining the joystick leftward or rightward to thereby vary the rotational speeds of the drive wheels 80, 80.

Figure 6:
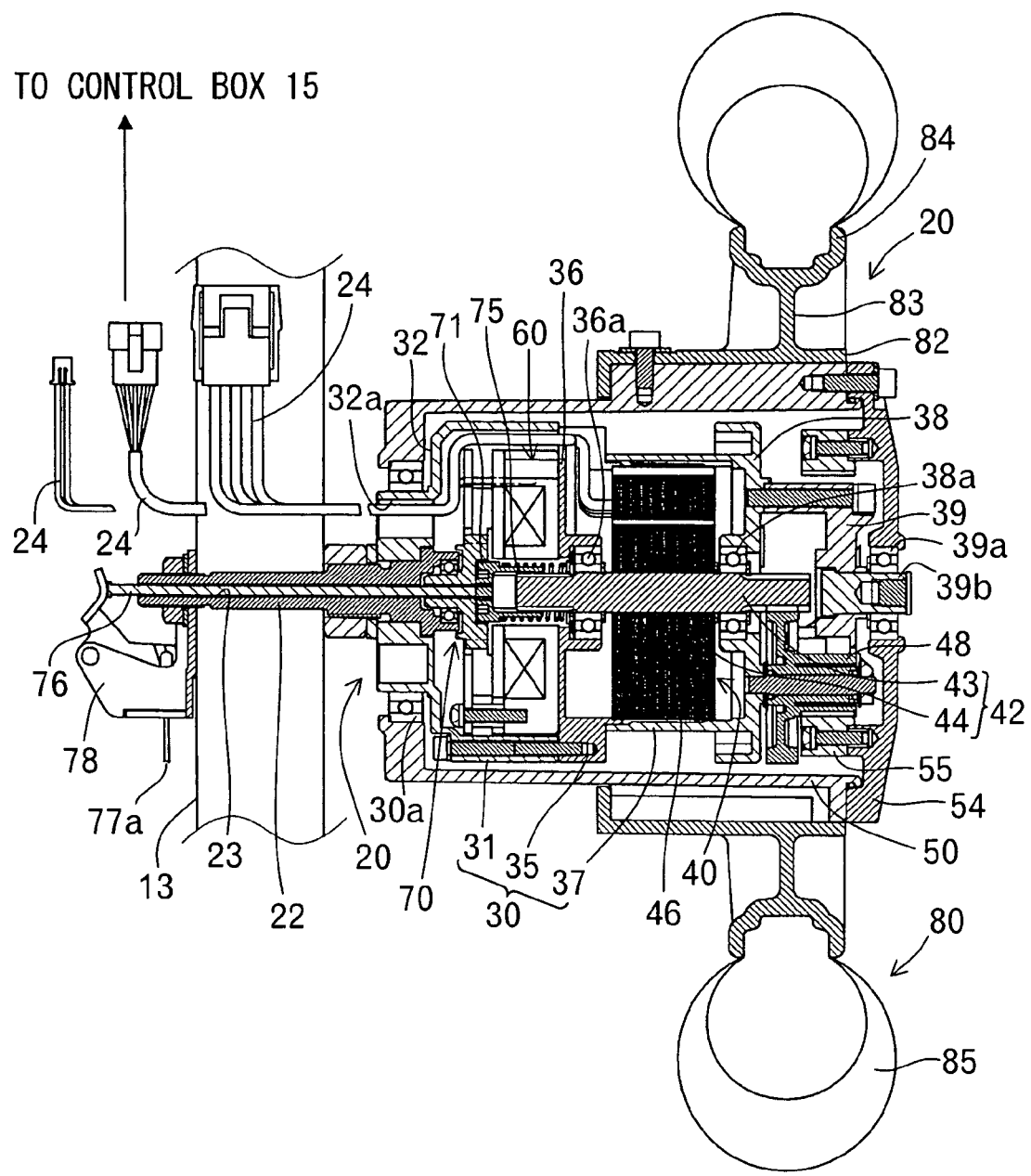
FIG. 6 is a sectional view of a drive device and a drive wheel of the second embodiment.

With reference to FIG. 6, the rotating shaft 43 of the motor 40 is connectable to or disconnectable from the electromagnetic brake 60 for braking the shaft 43 by the clutch mechanism 70 of the drive device 20.

Figure 7:
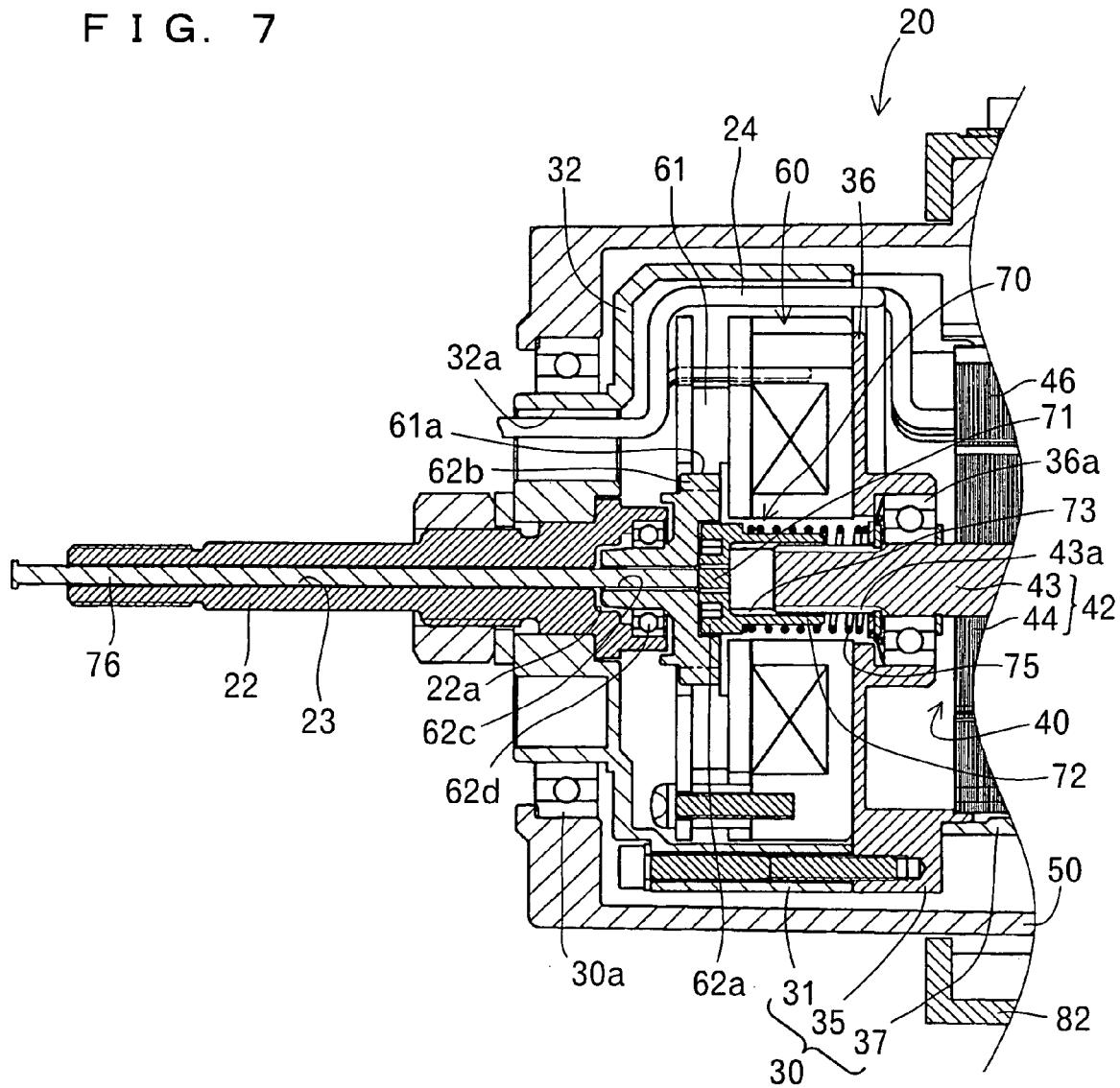
FIG. 7 is an enlarged sectional view showing a clutch mechanism of the drive device of the second embodiment and the vicinity thereof.

As shown in FIG. 7, the portion of the rotating shaft 43 closer to the frame 13 extends through the brake 60, and the base end of the shaft 43 is disconnectably connectable to an inner driver 62 of the brake 60 by the clutch mechanism 70.

FIG. 7 is an enlarged sectional view of the clutch mechanism 70 and the vicinity thereof. As shown in this drawing, the base end of the rotating shaft 43 is splined as at 43a. The clutch mechanism 70 has a movable piece 71 fitting around the base end of the shaft 43.

Figure 8:
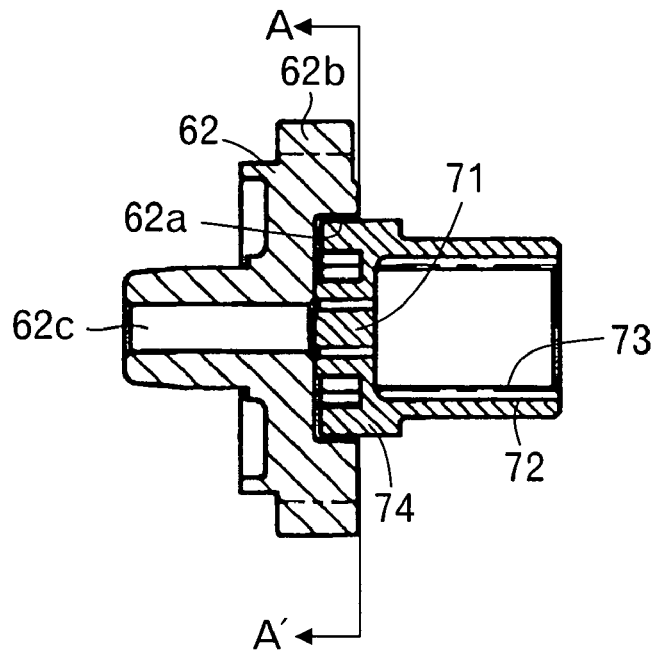
FIG. 8 is a sectional view showing a movable piece and an inner driver as they are removed.

The movable piece 71 has a tubular portion 72 closed at one end and open at the other end as shown in FIGS. 7 and 8. The inner periphery of the tubular portion 72 is splined as indicated at 73. The splined tubular portion 72 is fitted around the splined portion 43a of the rotating shaft 43 and made rotatable with the rotating shaft 43. The tubular portion 72 is closed at its base end, the outer periphery of which provides a dog clutch portion 74 (see FIG. 9).

The movable piece 71 can be made, for example, from a carbon steel (such as S45C) for mechanical structures, as refined. The portions of the shaft 43 and the movable piece 71 to be in mesh with each other are preferably coated with a solid lubricant, because if a fluid lubricant, such as an oil or grease, is used as a lubricant, the fluid lubricant will spatter to impair the braking performance of the brake 60 when the motor 40 is rotated.

Provided between the movable piece 71 and the annular plate 36 of the middle casing member 35 is biasing means 75 comprising a coil spring for biasing the movable piece 71 away from the rotating shaft 43.

Figure 9:
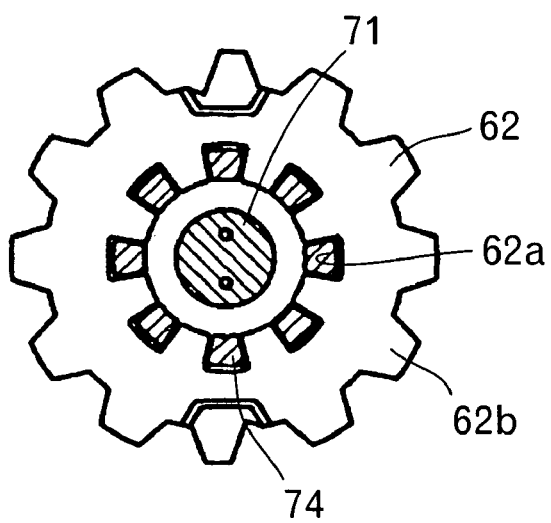
FIG. 9 is a view in section taken along the line A-A' in FIG. 8.

The dog clutch portion 74 provided on the outer periphery of base end of the movable piece 71 disengageably engaged with the inner driver 62 of the electromagnetic brake 60. FIGS. 8 and 9 show the movable piece 71 as engaged with the inner driver 62. As illustrated, the inner driver 62 has a dog clutch portion 62a formed inside thereof and engageable with the movable piece 71, and an outer periphery splined as at 62b and engageable with the brake disk 61 of the brake 60 to be described later so as to be rotatable with the disk.

It is desirable that the dog portions of the inner driver 62 and the movable piece 71 be also coated with a solid lubricant so as to ensure improved lubricity and higher abrasion resistance and to preclude impairment of braking performance of the brake 60 due to the spattering of lubricant.

As shown in FIG. 7, the inner driver 62 is rotatably fitted in a cavity 22a formed in the outer end of the axle 22, with a bearing 62d provided in the cavity around the driver. A push rod 76 for operating the clutch mechanism 70 slidably extends through a rod bore 62c formed in the inner driver 62 centrally thereof.

The splined outer peripheral portion 62b of the inner driver 62 is in engagement with the brake disk 61 of the brake 60. The brake disk 61 has an inner periphery splined as at 61a and engaged with the splined outer peripheral portion 62b of the inner driver 62.

The brake disk 61 is included in the electromagnetic brake 60. When the brake 60 is energized, a coil 63 is energized to deactivate the brake as in the first embodiment, while when the coil is deenergized, the force of spring applies pressure to the brake disk 61 to directly brake the rotating shaft 43. This ensures a braking action at the time of deenergization.

The clutch mechanism 70 is engaged or alternatively disengaged by the push rod 76 extending through the axle 22 and the inner driver 62 as shown in FIGS. 6 to 9. The push rod 76 has an outer end in contact with the movable piece 71, and a base end coupled to a push mechanism 78 for slidingly pushing the rod 76 toward the rotating shaft 43 as seen in FIG. 6. The push mechanism 78 can be, for example, a known bell crank mechanism, which can be operated with a wire 77a. The outer end of the wire 77a is connected to the clutch controller 77 which is disposed at a position accessible by the user or the help who assists in moving the electric wheelchair 10. For example, the clutch controller 77 is adapted to pull the wire 77a when manipulated by the help and return the wire 77a when released from the hand in the manner of the bicycle brake lever as shown in FIG. 5.

Figure 10:
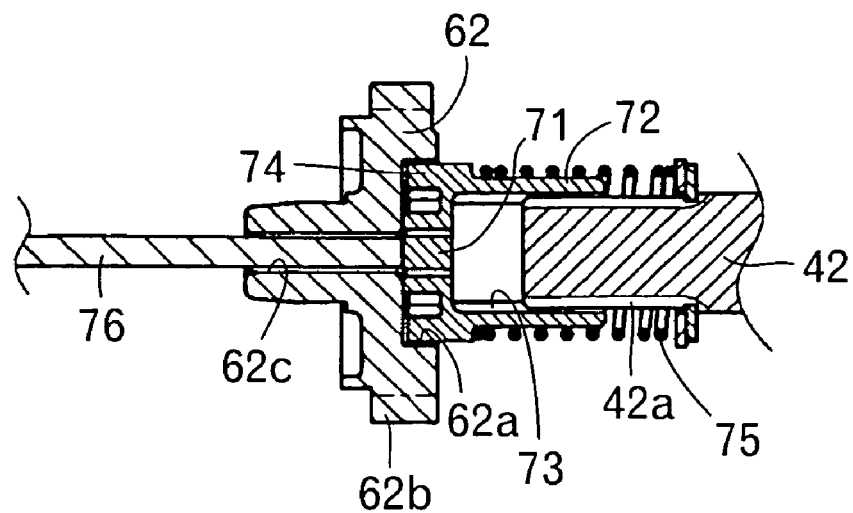
FIG. 10 is a sectional view showing the inner driver and the movable piece as engaged therewith.
Figure 11:
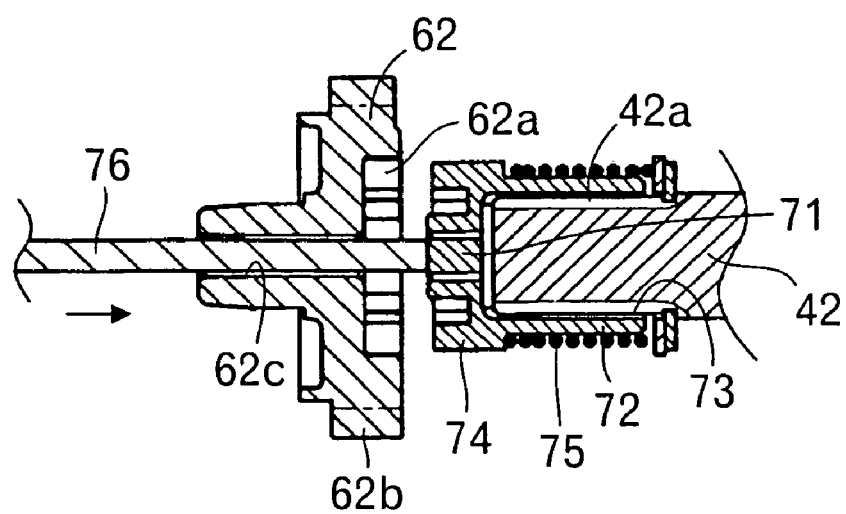
FIG. 11 is a sectional view showing the inner driver and the movable piece as disengaged therefrom.

When the clutch controller 77 is manipulated by the user or help, the wire 77a is pulled, causing the push mechanism 78 to force the push rod 76 toward the rotating shaft 43. The rod 76 pushes the movable piece 71, engaged with the inner driver 62 by the biasing means 75 as shown in FIG. 10, toward the rotating shaft 43, disengaging the movable piece 71 out of engagement with the inner driver 62 as seen in FIG. 11. Consequently, the brake 60 ceases acting on the drive wheel 80 regardless of whether the brake 60 is turned on or off.

According to the present invention, the rotating shaft 43 of the motor 40 is always coupled to the drive wheel 80, so that when energized, the motor 40 serves as a generator, effecting regenerative braking to pass DC current to the control box 15, namely, applying a dynamic braking force of the motor 40 to the drive wheel 80 as a load, even if the drive wheel 80 is free of the action of the electromagnetic brake 60. The wheel 80 is therefore not free to rotate. Accordingly, even when the drive wheel 80 is disconnected from the brake 60 by the action of the clutch mechanism 70, a given load of resistance is offered to the rotation of the wheel 80, which is therefore unlikely to become accelerated even on a downward slope.

The control means in the control box 15 is adapted to judge whether the speed of the drive wheel 80 is increasing or decreasing at this time with reference to a speedometer for detecting the rotational speed of the wheel 80. When the result of judgment indicates a speed increase, the control means of the control box 15 short-circuits the wiring of the stator 46 to increase the above-mentioned load of resistance of the motor 40 by short-circuit braking to produce an increased braking force. Even if the control means still recognizes an increase in the speed on the speedometer, the control means reverses the direction of rotation of the motor 40 for plugging. The control means may be adapted to reduce the speed in this way by multistage braking.

When the clutch mechanism 70 is disengaged to disconnect the electromagnetic brake 60 as actuated, the drive wheel is released from the braking force of the brake 60, so that the clutch mechanism 70 can be utilized also when the wheelchair is pushed forward by the help manually.

When the push rod 76 is pulled back by manipulating the wire 77a, with the brake 60 disconnected from the rotating shaft 43 (FIG. 11), the biasing force of the biasing means 75 pushes the movable piece 71 toward the inner driver 62, bringing the movable piece 71 into engagement with the inner driver 62 again as shown in FIG. 10. When the brake 60 is turned on with the movable piece 62 in engagement with the inner driver 62, the brake 60 acts to brake the rotation of the rotating shaft 43 to prevent the rotation of the drive wheel 80.

The drive device 20 thus constructed is secured to the electric wheelchair 10, with the axle 22 supported at one end thereof by the frame 13. When the electric wheelchair 10 is to be used without making the drive device 20 removable therefrom, the drive device 20 may be fastened to the frame 13 as with a bolt, whereas if there is a need to remove the drive device 20 along with the drive wheel 80 as fitted therearound, for example, to carry the wheelchair 10 on a motor vehicle, a structure may be provided for preventing the axle 22 from slipping off from the frame 13 axially thereof so as to render the drive device removable easily. When required, a member may be provided for receiving the reaction force of torque of the motor 40.

When the user gives a command to advance, retract or turn the electric wheelchair 10 by the control device 18, each electromagnetic brake 60 is energized and thereby deactivated, and each stator 46 is energized to rotate the rotor 42. When the rotor 42 is rotated, a drive force is delivered from the rotating shaft 43 to the housing 50 by way of the reduction gear 48 and the internal gear 55 to rotate the housing 50. This rotates the drive wheel 80 secured to the housing 50. Thus, the electric wheelchair 10 is advanced or retracted. The wheelchair 10 is turned by varying the rotational speeds of the left and right drive devices 20.

While the clutch mechanism 70 is not manipulated by the help, the rotating shaft 43 of the motor 40 is connected to the inner driver 62 of the electromagnetic brake 60 by the biasing force of the biasing means 75 as shown in FIG. 10 for rotation therewith. When the brake 60 is actuated in this state, the rotating shaft 43 of the motor 40 is directly braked, so that the brake 60 exhibits effective braking performance.

On the other hand, when the clutch controller 77 is manipulated with the brake 60 actuated to disconnect the rotating shaft 43 of the motor 40 from the brake 60 by the clutch mechanism 70, the brake 60 exerts no braking force on the drive wheel 80 but the dynamic braking force of the motor 40 acts on the wheel. Accordingly, even if the brake 60 is disconnected by manipulating the clutch controller 77 on a downward slope or the like in error, the drive wheel 80 is unlikely to become accelerated over a given level. Further because the brake 60 can be disconnected by the clutch controller 77, the help need not turn on the power source for the electric wheelchair 10 when pushing the wheelchair 10 manually.

Although FIG. 5 shows the clutch controllers 77, 77 as provided respectively on the left and right handles 19, 19 to be held by the help, the controller 77 may be provided on only one handle for operating both the clutch mechanisms 70, 70. The controller 77 is not limited only to the structure comprising the push rod 76 or wire 77a.

Furthermore, the controller 77 may be made accessible by the user of the electric vehicle.

Apparently, the present invention can be altered or modified by one skilled in the art without departing from the spirit of the invention. Such a modification is included within the scope of the invention as set forth in the appended claims.

What is claimed is:

1. A drive device for an electric vehicle which is provided on an inner periphery of each of left and right drive wheels of the electric vehicle, the drive device being characterized in that the drive device comprises:
   an axle mounted on the electric vehicle,
   a casing supported at one end thereof by the axle on the electric vehicle,
   a motor housed in the casing, the motor including a stator and a rotor having a rotating shaft, the rotor being disposed within the stator and the rotating shaft of the rotor being aligned axially with the axle, and
   a housing rotatably fitted around an outer periphery of the casing and rotatable by the rotation of the motor,
   the drive wheel being provided around an outer periphery of the housing and rotatable with the housing.

2. The drive device for electric vehicles according to claim 1 wherein the drive wheel is disposed in the vicinity of one end of the drive device opposite to the axle.

3. The drive device for electric vehicles according to claim 1 wherein the casing has radiating fins at an axle side thereof, and the housing or the drive wheel has blades positioned as opposed to the radiating fins for cooling the radiating fins.

4. An electric wheelchair comprising the drive device according to claim 1, the drive device being provided on each of left and right sides of the electric wheelchair.

5. The drive device for an electric vehicle according to claim 1, wherein the rotating shaft and the drive wheel are rotatable about the same center.

6. A drive device provided on an inner periphery of each of left and right drive wheels of an electric vehicle, the drive device being characterized in that the drive device comprises:
   an axle mounted on the electric vehicle,
   a casing supported at one end thereof by the axle on the electric vehicle,
   a motor housed in the casing, the motor including a stator and a rotor having a rotating shaft, the rotor being disposed within the stator and the rotating shaft of the rotor being aligned axially with the axle,
   an electromagnetic brake housed in the casing and disposed closer to the axle than the motor for braking the motor, and
   a housing rotatably fitted around an outer periphery of the casing and rotatable by the rotation of the motor,
   the drive wheel being provided around an outer periphery of the housing and rotatable with the housing.

7. The drive device according to claim 6 wherein the electromagnetic brake directly brakes the rotating shaft of the motor.

8. An electric wheelchair comprising the drive device according to claim 6, the drive device being provided on each of left and right sides of the electric wheelchair.

9. The drive device for an electric vehicle according to claim 6, wherein the rotating shaft and the drive wheel are rotatable about the same center.

* * * * *